US007774132B2

(12) United States Patent
DeGrazia

(10) Patent No.: US 7,774,132 B2
(45) Date of Patent: Aug. 10, 2010

(54) PROVIDING NAVIGATION DIRECTIONS

(75) Inventor: Bradley Richard DeGrazia, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 11/428,782

(22) Filed: Jul. 5, 2006

(65) Prior Publication Data

US 2008/0046170 A1  Feb. 21, 2008

(51) Int. Cl.
*G01C 21/00* (2006.01)
(52) U.S. Cl. .......................... 701/202; 701/1; 701/207; 701/208; 701/209; 701/211; 340/988; 340/990; 340/995.14; 340/995.23; 342/357.06; 342/357.07; 342/357.08; 342/357.1; 702/150; 702/185; 704/234; 704/275
(58) Field of Classification Search ................. 701/202, 701/200, 201, 300
See application file for complete search history.

(56) References Cited

U.S. PATENT DOCUMENTS

| | | | | |
|---|---|---|---|---|
| 5,506,779 A | * | 4/1996 | Kanki | 701/209 |
| 5,884,218 A | * | 3/1999 | Nimura et al. | 701/208 |
| 6,199,045 B1 | * | 3/2001 | Giniger et al. | 705/1 |
| 6,208,934 B1 | * | 3/2001 | Bechtolsheim et al. | 701/209 |
| 6,320,535 B1 | * | 11/2001 | Hillman et al. | 342/357.1 |
| 6,381,535 B1 | * | 4/2002 | Durocher et al. | 701/202 |
| 6,459,989 B1 | * | 10/2002 | Kirkpatrick et al. | 701/215 |
| 6,574,549 B2 | * | 6/2003 | Cato et al. | 701/200 |
| 6,816,727 B2 | | 11/2004 | Cox et al. | |
| 7,035,650 B1 | * | 4/2006 | Moskowitz et al. | 455/456.5 |
| 7,127,403 B1 | * | 10/2006 | Saylor et al. | 704/275 |
| 7,194,069 B1 | * | 3/2007 | Jones et al. | 379/88.02 |
| 7,493,629 B2 | * | 2/2009 | Pfeifer | 719/330 |
| 7,551,728 B2 | * | 6/2009 | Cohen et al. | 379/88.18 |
| 2002/0128765 A1 | * | 9/2002 | Cato et al. | 701/200 |
| 2002/0152053 A1 | * | 10/2002 | Roy et al. | 702/185 |
| 2004/0204829 A1 | * | 10/2004 | Endo et al. | 701/202 |
| 2005/0049785 A1 | * | 3/2005 | Vergin | 701/209 |
| 2005/0060088 A1 | | 3/2005 | Helal et al. | |
| 2005/0071119 A1 | * | 3/2005 | Obradovich et al. | 702/150 |
| 2005/0107953 A1 | * | 5/2005 | Sugla | 701/300 |
| 2005/0143916 A1 | * | 6/2005 | Kim et al. | 701/214 |

(Continued)

OTHER PUBLICATIONS

Verizon Wireless, "Let VZ Navigator Show You The Way!", http://www.verizonwireless.com/b2c/splash/turnbyturn.jsp, 2006, 2 pages.

(Continued)

*Primary Examiner*—Khoi Tran
*Assistant Examiner*—Jonathan Sample
(74) *Attorney, Agent, or Firm*—Stolowitz Ford Cowger LLP

(57) ABSTRACT

In one embodiment, a navigation system provides navigation directions within particular locations within a facility, such as within a corporate campus, airport, resort, building, etc. The navigation system may respond to navigation requests for different types of facility target destinations such as a location, a person, a movable item, an event, or a condition. Different location resources can be accessed depending on the type of requested target destination. For example, an employee database may be used to locate an office within the facility associated with navigation request that contains an employee name. A natural voice communication scheme can be used to access to the navigation system through a larger variety of networks and communication devices.

18 Claims, 5 Drawing Sheets

U.S. PATENT DOCUMENTS

| | | |
|---|---|---|
| 2005/0219120 A1 | 10/2005 | Chang |
| 2006/0100779 A1* | 5/2006 | Vergin ........................ 701/211 |
| 2006/0135183 A1* | 6/2006 | Zavada et al. ............... 455/457 |
| 2006/0161342 A1* | 7/2006 | Tomoda ...................... 701/209 |
| 2006/0212217 A1* | 9/2006 | Sheha et al. ................. 701/209 |
| 2006/0212561 A1* | 9/2006 | Feng ........................... 709/223 |
| 2007/0198267 A1* | 8/2007 | Jones et al. ................. 704/257 |
| 2007/0219711 A1* | 9/2007 | Kaldewey et al. ........... 701/208 |
| 2008/0004875 A1* | 1/2008 | Chengalvarayan et al. .. 704/234 |
| 2008/0046170 A1* | 2/2008 | DeGrazia .................... 701/202 |

OTHER PUBLICATIONS

Shanmugham et al., "A Media Resource Control Protocol Developed by Cisco, Nuance, and Speechworks", Apr. 5, 2005.

\* cited by examiner

PROVIDING NAVIGATION DIRECTIONS

BACKGROUND OF THE INVENTION

This invention relates generally to a navigation system and more particularly to providing navigation directions.

Dynamic navigation systems generally rely on Global Positioning System (GPS) technology. These GPS based systems triangulate a user's current approximate position using satellites.

After triangulating a user's current position, some systems may provide navigation directions. These systems compare the triangulated position to a destination street address provided by the user. Next, these systems access public information such as an electronic street map to determine directions from the user's current location to the destination street address. After determining the directions, these systems provide turn-based directions to the user.

These conventional navigation systems do not provide specific navigation information within a particular address location. For example, existing navigation systems do not provide navigation advice for locating particular building, office, or meeting locations at a particular address or corporate business location.

Furthermore, these navigation systems have limited capability for communicating with other servers and databases that may include additional information that could assist in locating more specific building locations, persons or meetings. For example, conventional navigation systems generally provide directions wirelessly over a cellular network. Since bandwidth on cellular networks is limited, these systems are designed to minimize the amount of cellular network bandwidth used between a portable navigation device and a navigation base station.

According, to minimize the amount of cellular bandwidth used, communications from the base station to the portable navigation device are transmitted as encoded non-voice data to minimize cellular network bandwidth. The portable navigation device then decodes the encoded non-voice data back into voice data. The voice data is then played out by the portable navigation device as audio prompts. These cellular transmissions of encoded navigation information require specific preconfigured communication protocols between the base station and the portable navigation system that are not readily integratable with other networks and computer systems.

DETAILED DESCRIPTION

Voice Band Communications

Figure 1:
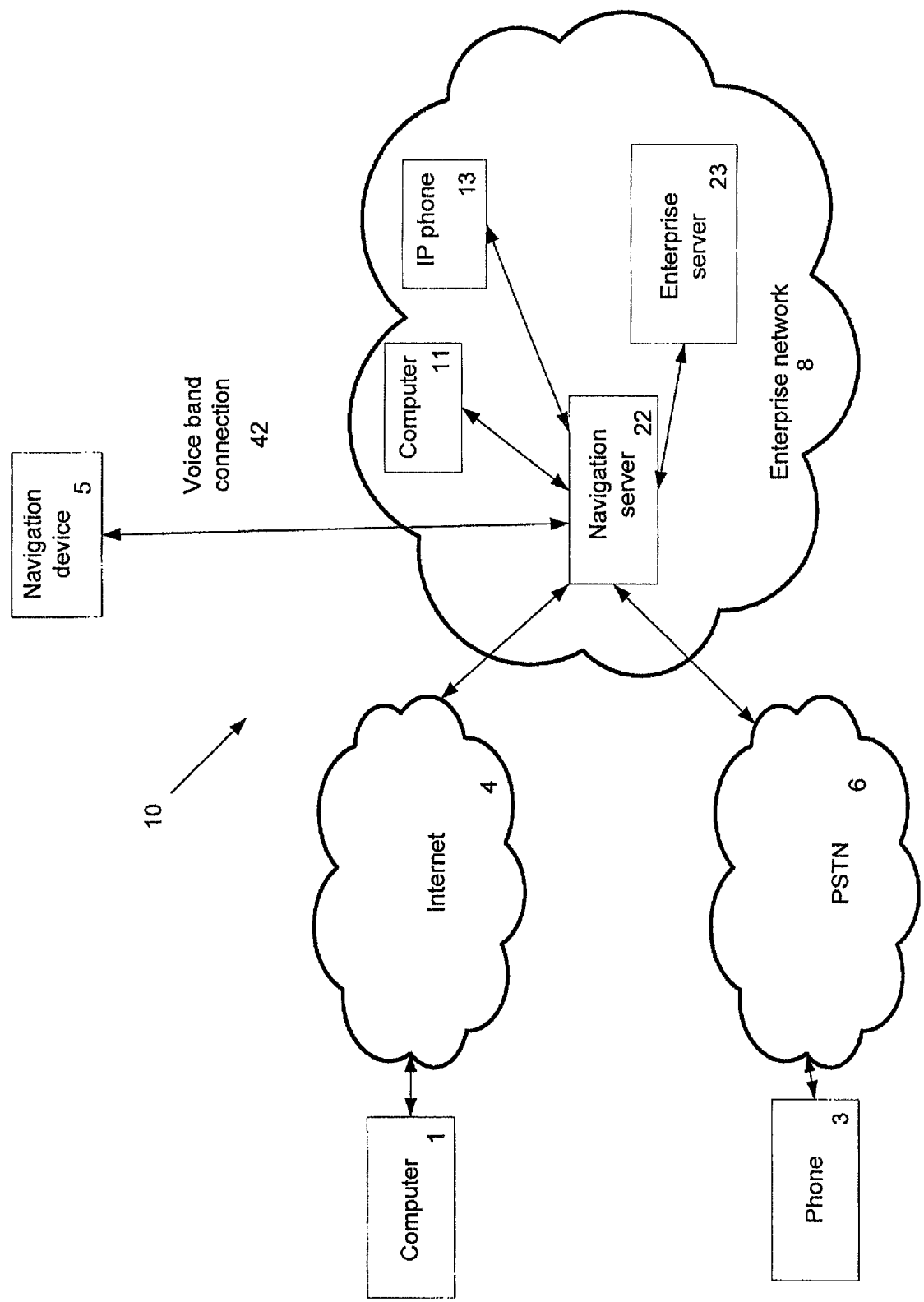
FIG. 1 is a diagram showing a navigation server operating in an enterprise network.

FIG. 1 shows a navigation server 22 that converts natural language voice commands into requests using a natural language processor. Some differences between FIG. 1 and a conventional navigation system are immediately apparent. First, the navigation server 22 exchanges communications with the portable navigation device 5 over the voice band connection 42. Second, the navigation server 22 can provide navigation directions to a wider variety of different networked devices 1, 3, 11 and 13, not just portable navigation devices having preconfigured decoders. These differences are explained below.

The navigation server 22 provides navigation directions in the form of natural language voice data to a portable navigation device 5 in response to natural language navigation requests. In one embodiment, the navigation requests and directions are sent entirely over a voice band connection 42 allowing the device 5 to receive the voice data communications for immediate play out.

Other examples of network devices that may receive navigation directions from the navigation server 22 are a computer 1 communicating over the Internet 4, a computer 11 located in an enterprise intranet 8, and a Voice over Internet Protocol (VoIP) phone 13. In one embodiment either of the computers 1 and 11 may be a personal computer, processor, Personal Digital Assistant (PDA), cell phone, smart phone, etc. When a network device lacks a speaker, the voice data may be converted into text instead of using natural language voice signals.

As described above, one advantage of the voice band connection 42 is that the navigation device 5 may accept and relay natural language commands to the navigation server 22. Natural language commands are speech-based commands that typically require interpretation by a powerful computing device. A conventional portable navigation device 5 may not have the processing power to process natural language commands. However, due to the voice band connection 42, the device 5 does not need a natural language processor or a speech recognition unit to understand the natural language commands. The device 5 may simply relay the natural language commands directly to the navigation server 22 without first converting the natural language command into encoded data. The navigation server 22 can then do the conversion of the natural language commands into text data requests.

The voice band connection 42 facilitates compatibility with many more devices than the encoded data connections of conventional navigation systems. For example, the directions provided by conventional navigation stations can only be received by navigation devices with preconfigured decoders. In contrast, the voice data navigation directions provided by navigation server 22 can be received by any voice data capable network device. For example, a navigation request can be sent as a natural language audio signal request from the PSTN phone 3 to the navigation server 22. The PSTN phone 3 can then receive back voice data navigation directions that are played out to the user.

To offset the increase in cellular network bandwidth of voice band communication 42, the navigation server 22 may be configured to first attempt to communicate using other networks, for example, the PSTN 6, the Internet 4 or wireless networks. This technique is described in greater detail in the next section.

Although the above-described embodiment sends requests and navigation directions in the voice band, other embodiments may send some communications out of band with respect to the voice data. Other embodiments of the navigation server 22 exchange voice data communications with some network devices and non-voice text communications with other network devices depending on the capabilities of the device and wireless communication systems. Yet other embodiments of the navigation server 22 may send text communications instead of voice data depending on the network device.

Multi-Network Communication

FIG. 1 shows the navigation server 22 connected to network devices through the PSTN 6, the Internet 4 and the enterprise network 8. In one embodiment, the navigation server 22 conserves cellular bandwidth by using other non-cellular networks whenever possible to provide navigation instructions. For example, a user arriving at an airport of an unfamiliar city may need navigation directions to a meeting room within a large building. Although the user has a cellular phone or other portable navigation device to call the server 22, a PSTN phone 3 may be used to send a navigation request over the PSTN 6 to the navigation server 22.

When arriving at the parking lot for the building, the user may then use the cell phone to send another navigation request over the cellular network to the server 22 to determine which building entrance to use. After entering the proper door, the user may then check out a portable navigation device that communicates wirelessly with the navigation server 22 through an access point in enterprise network 8. The user sends a third navigation request over the enterprise network 8 and receives back audio navigation directions to a specific meeting room.

As shown in the above example, communication over the PSTN 6 and the enterprise network 8, when appropriate, conserve cellular bandwidth. Other networks such as the Internet 4 may also be used to conserve cellular bandwidth.

Locating a Lost Person

Figure 2:
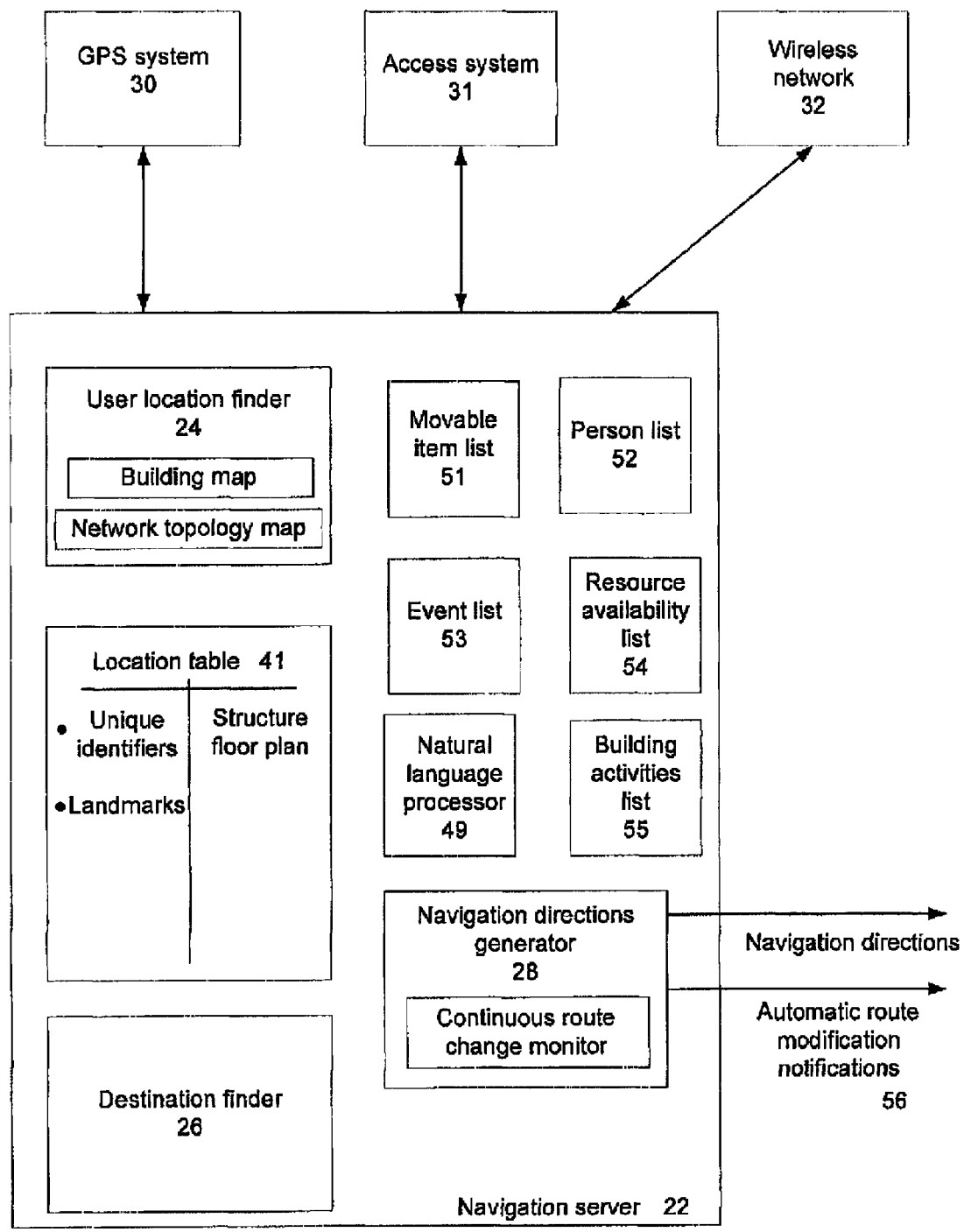
FIG. 2 is a detailed diagram of the navigation server in FIG. 1.

FIG. 2 shows one embodiment of the navigation server 22 in more detail. The server 22 includes a user location finder 24 that locates a user by communicating with a GPS 30, an access system 31, a wireless network 32 and a location table 41.

The user location finder 24 may be configured to attempt to locate a user via GPS 30 before using other methods. Thus, when a navigation request is received the finder 24 first communicates with a GPS 30 to identify a longitudinal and latitudinal position for the user. Generally the finder 24 will accurately locate the user using the GPS 30 when the user is located outside a structure.

When a user is located within a structure, particularly a multi-floored structure, the GPS 30 may not be sufficient. For example, GPS 30 signals may not work through the structure or the GPS 30 triangulation techniques may not reveal what floor the person occupies. Accordingly, in one embodiment, when GPS is not sufficient the finder 24 communicates with an access system 31, a wireless network 32 and/or a location table 41.

An access system 31 such as a Radio Frequency Identification (RFID) security system is typically deployed by outfitting a structure with several RFID scanners and deploying RFID tags to uniquely identify employees. When an employee with an RFID tag approaches a restricted area, the building RFID scanner identifies the employee, and if the employee is authorized, allows the employee access to the area.

Some access systems are short range because they require a user to position an RFID tag to communicate with an RFID scanner. Long ranges access systems, however, do not require a user to position the RFID tag. These long-range systems have identification nodes that communicate with employee identifiers at long range.

Regardless of whether the access system 31 is short or long range, the user location finder 24 communicates with the system 31 to determine which scanner most recently identified the user. The finder 24 then compares the scanner location to a building map to determine the location of the tagged user. This non-triangulation location technique is better than GPS triangulation because the finder 24 is able to determine which floor of the building the user occupies.

The location finder 24 may also determine a location within a structure by communicating with an enterprise network 8. In one embodiment, the network 8 includes wireless access points located throughout a building. When a person carrying a WiFi enabled device walks through the building, the WiFi enabled device continually chats with the wireless access points.

Accordingly, the finder 24 communicates with the enterprise network 8 to determine which wireless access point is closest to the user based on the chatting. Next, by comparing a network topology map to a building map, the finder 24 determines the location of the person.

The location finder 24 may also determine a location by communicating with an internal location table 41. The location table 41 is preconfigured to associate structure location identifiers with a structure floor plan. The structure location identifiers may include any identifiers placed within a structure to label a location or object. For example, some enterprise structures include pole locators usable to convey a building location during an emergency. The location table 41 leverages these emergency pole locators.

When the finder 24 receives a navigation request identifying a nearby structure location identifier, the location table 41 is used to determine where the user is located in the building. Unlike GPS triangulation, this location technique reveals which floor of a building a user is located on. Thus, in a multi-floored building the finder 24 can resolve what floor the user is located on so that directions may be provided to a different floor.

Other structure location indicators include structure landmarks such as a cafeteria, lockers, stairwells, emergency exits, etc. Any object or place that a person could use to conversationally describe their location may be included in the table 41. Configuration of these structure landmarks allows finder 24 to respond to a conversational style natural language navigation request. For example, a lost person uses a handheld wireless computing device to send a natural language navigation request, "I am facing the emergency exit in the cafeteria. I need to get to the edge server product launch meeting." The request is converted into text data by a natural language processor 49 and the text data is transferred to the user location finder 24. The finder 24 receives the translated request and determines the lost person's location using the preconfigured location table.

The natural language processor 49 may be within the navigation server 22 as shown in FIG. 2. Alternatively the server 22 may use the Media Resource Control Protocol (MRCP) to transfer the natural language commands to another enterprise device for remote processing. MRCP is described in draft-shanmugham-mrcp-07.txt which is herein incorporated by reference and which may be found on the Internet Engineering Task Force (IETF) website. Thus, the server 22 can leverage the processing capability of other devices included within, or coupled to, the enterprise network 8.

Some embodiments of the location finder 24 use combinations of the above methods to locate a person. Other embodiments only use some of the above-described techniques. Yet other embodiments rely on one or more techniques as backups when preferred location determination techniques are unsuccessful.

Determining a Destination Location

FIG. 2 shows one embodiment of the navigation server 22 that includes a destination finder 26 that converts a navigation objective into a destination location.

Conventional navigation systems generally provide directions to a destination after a user provides a street address. This conventional navigation system only provides navigation directions to a structure having a street address. The person arriving at the structure may still need navigation directions to reach a particular destination within the structure. For example, it does little good to receive directions to a particular building address if the user cannot quickly find a particular room location in the building where a meeting will soon take place.

In contrast to convention navigation systems, the destination finder 26 can locate a destination not associated with a street address. For example, the location finder 26 receives a navigation request list including a destination objective. The destination objective may include any of a structure location identifier, a person, an event, a movable item or a condition. The handling of each of these types of navigation objectives will be addressed in turn.

When the destination objective includes a structure location identifier, the destination finder 26 communicates with the location table 41 to determine an associated location. The location table 41 provides the location in a manner similar to the user location determination that was previously described.

The destination objective may also be a name or other person identifier. When the destination objective is a person, the user may have no idea where he is attempting to go. Instead, the user knows that he is supposed to find a specific person to meet with. Accordingly, the destination finder 28 communicates with a person list 52 when a named person is included in the destination objective.

In one embodiment, the person list 52 includes a directory of persons working in a particular structure and associated working locations. Similar to the other elements shown in navigation server 22, the person/employee list 52 may be located within the navigation server 22 on the enterprise server 23 (FIG. 1) or elsewhere in, or external from, enterprise network 8.

In another embodiment, the person list 52 may be continually updated with the temporary locations of persons in the building. In this embodiment, temporary personnel locations are determined by communicating with the access system 31. For example, an RFID access system 31 may determine the temporary location of any RFID tagged person. In another embodiment, temporary personnel locations are determined by communicating with a calendaring system located in an enterprise network 8. The calendaring systems identifies meeting locations and participants associated with a particular person to determine that person's possible location.

The destination objective may also be an event. In one example, a user may need to attend a meeting, but does not know the location of the meeting. The user sends a navigation request to the navigation server 22 that identifies the title of the event, such as "Product Launch Meeting". The destination finder 26 communicates with event list 53 when the event title is identified. The event list 53 is continually updated according to a calendaring system located on the enterprise server 23 (FIG. 1) to include the location of events occurring within the structure.

An object may also serve as a destination objective. For example, a user may need to determine the location of product samples. The user makes a navigation request by providing the name of the item to the navigation server 22. The destination finder 26 identifies an item name in the navigation request and accordingly communicates with an item list 51 to determine a possible destination location.

The location of movable items may be a continually updated using an inventory tracking system. Inventory tracking systems may include Universal Product Code (UPC) tracking systems, RFID tracking systems, etc. These inventory tracking systems generally tag a movable item with a unique identifier. The tagged item is then tracked using the tag as it moves through the structure. Thus, destination finder 26 can leverage location information from an inventory tracking system to convert an item-based destination objective into a destination location.

The destination finder 26 may use condition based destination objectives. For example, a user may request navigation directions to the nearest available conference room. First, the destination finder 26 communicates with the user location finder 24 to determine the user's current location. Next, the finder 26 compares the user's location with a resource availability list 54 to determine which available conference room is closest to the current user location. The resource availability list 54 may include a calendaring system that shows which conference rooms are available at a particular time.

The resource availability list 54 can also be used as a resource checkout system. For example, a structure may include supply rooms for checking out building supplies. These inventory supply rooms have tracking systems that identify the availability status of building resources. The destination finder 26 leverages the resource availability list 54 provided by the inventory supply system to determine a nearest available requested resource.

The above example condition was for availability of items identified in an availability list 54. However, any condition may be associated with a destination location. For example, a user may provide a meeting time as a destination objective. In other examples, a user may provide a condition such as the invite list to a meeting, rather than the meeting time or the meeting name.

Destination objectives may include any combination of the above examples, or other conditions, to more efficiently determine a destination location. For example, a destination objective may include a person and a meeting time. Once the destination location is determined, this location as well as the user location is provided to the navigation directions generator 28.

Any of the components shown within the navigation server 22 may be located outside the navigation server 22. For example, a calendaring system located on a server 23 in an enterprise network 8 may provide the event list 52 to the navigation server 22.

Navigation Directions with Structure Landmark Descriptions

FIG. 2 shows one embodiment of the navigation server 22 that includes a navigation directions generator 28 that generates navigation directions based on a comparison of the user's location and a destination location to a building map. The generator 28 may then provide navigation directions that include building landmark descriptions.

When a user is outside the structure, the generated navigation directions may be similar to turn-based directions provided by a conventional GPS. In other words, the directions may direct a user when to turn left or right at particular streets.

When a user is inside the a building complex or inside a particular building structure, the navigation directions may be conversational in that they may be based on descriptions of landmarks within the building. In one example, the navigation directions generator 28 first determines a navigation path for the user by comparing the user's location and a destination location to a building map. Next, the generator 28 communicates with the location table 41 to determine landmarks oriented along the path. The generator 28 can then provide a voice-based audio description of these landmarks as the user approaches his destination location.

The landmark descriptions may be used as the sole type of navigation directions. The server 22 monitors a user's location using the location finder 24. The generator 28 then uses landmark descriptions to guide the user along the determined path. For example, the generator 28 directs the user to head towards the cafeteria, then move west towards the lockers, etc.

Preferably, the landmark descriptions are provided to supplement turn-based directions. The server 22 monitors a user's location using the location finder 24 and provides turn-based directions to guide the user along the determined path. The generator 28 then reinforces the turn-based directions by mixing in landmark descriptions. For example, the generator 28 directs a user to turn left at the end of a hall. After the user successfully turns left, the generator 28 informs the user that he should be passing a staircase on his right.

In another embodiment, the generator 28 is configured to provide landmark descriptions in response to assurance requests by a user. For example, the user sends the navigation server 22 a natural language request indicating that he is unsure whether he turned at the right place. The generator 28 assures the user that the correct turn was taken by providing a description of a nearby building feature. When the user has taken the wrong turn, an automatic real time route modification may be sent.

Automatic Real-Time Route Modifications

One embodiment of the navigation server 22 provides route modifications or corrections 56 in real-time. These course corrections 56 are provided in three circumstances, e.g. when the user gets lost, when building activities require a path change and when the destination location changes.

The navigation direction generator 28 is configured to communicate with the location finder 24 to continually determine whether the user is following the navigation directions. When a determination is made that the user is off course, the generator 28 automatically issues route corrections 56 to redirect the lost user towards the destination location.

The directions generator 28 may also issue route modifications 56 when a building activity requires a course correction. The generator continuously communicates with a building activities list 55 to determine any building activities that may block a particular course. Examples of such building activities can include emergencies, general structure maintenance, cleaning, broken elevators, etc. The generator 28 compares the activities with a user navigation path. When one of the building activities blocks the path, an automatic route correction 56 is sent directing the user to change course appropriately.

The generator 28 may also issue route modifications or corrections 56 when a destination changes. Destination changes may occur, for example, when a meeting is rescheduled to a different room. In another example, a destination changes when the destination objective is a person or a movable item that has moved. The generator 28 determines these destination changes by continually communicating with the lists 51-54. When there is a destination change, an automatic route modification 56 is sent to the user.

Real Time Exchange Over a Continuously Maintained Connection

Figure 3:
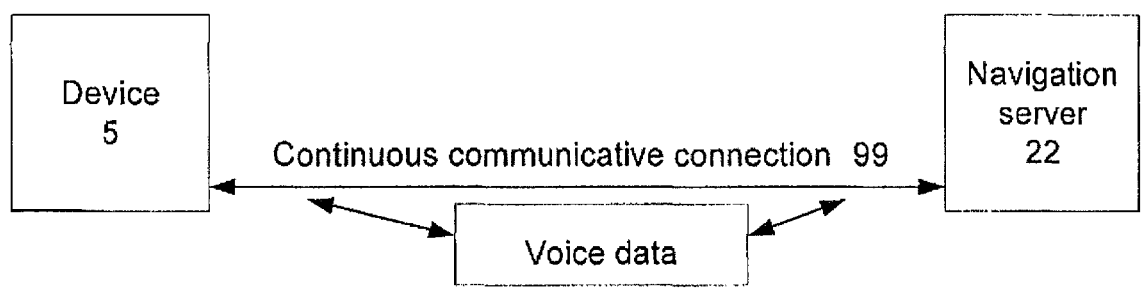
FIG. 3 is a detailed diagram showing a connection between a navigation device and the navigation server in FIG. 1.

FIG. 3 shows one embodiment of the navigation server 22 that continuously maintains a communicative connection 99 with a navigation device 5. This continuously maintained connection 99 allows for a real time exchange between the device 5 and the server 22. The real time exchange facilitates a conversation style exchange by allowing the device 5 and the server 22 to communicate without delays caused by reestablishing a connection.

The connection 99 is real time because natural language commands are immediately relayed and are not stored in the device 5 in conjunction with processing. Conventional navigation devices store requests during the decoding of non-voice data.

This real time feature advantageously allows a user to receive responses to navigation assurances over the connection 99 without waiting for a reconnection. Moreover, the server 22 is able to send the automatic route modifications 56 immediately without a connection delay.

Figure 4:
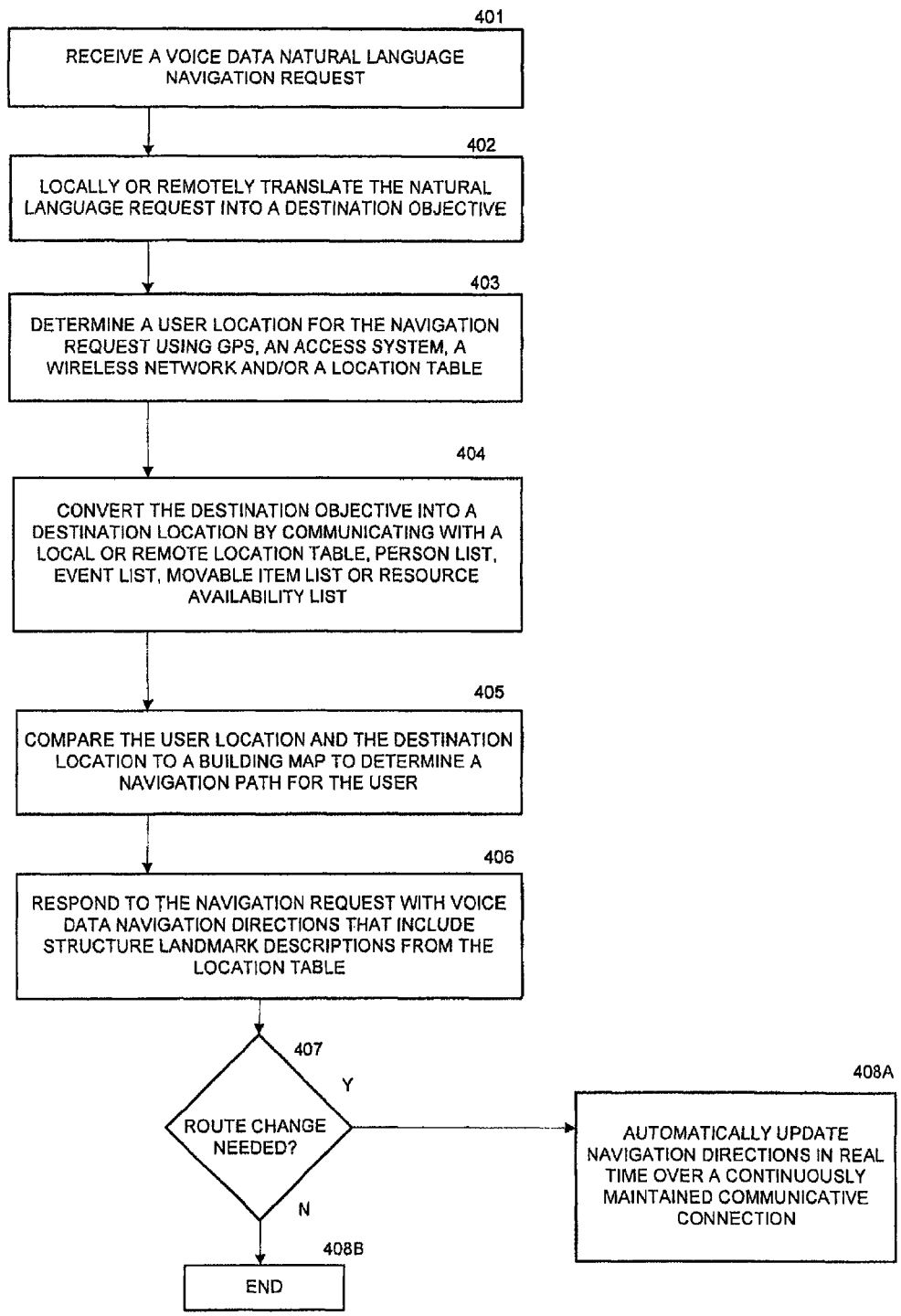
FIG. 4 is a flowchart showing how the navigation server in FIG. 1 provides navigation directions.

FIG. 4 is a flowchart showing how the navigation server 22 in FIG. 1 provides navigation directions. In block 401 the navigation server 22 receives a natural language request over a voice band connection. Next, the navigation server 22 causes the natural language request to be translated into a destination objective in block 402.

In block 403 the server 22 determines a user location for the navigation request. The determination is made by communicating with a GPS, an access system, a wireless network and/or a location table. In block 404 the server 22 converts the destination objective into a destination location. The conversion is made according to communications with a location table, a person list, an event list, a movable item list or a resource list, any of which may be located within the navigation server 22 or elsewhere on an enterprise network. In block 405 the server compares the user location and the destination location to a building map to determine a navigation path for the user.

After determining a path, in block 406 the server responds to the navigation request with voice data navigation directions that include structure landmark descriptions from the location table. Next, the server 22 continually monitors the user and the path to determine whether a route change is needed in block 407. When a route change is needed in block 408A, the server 22 automatically updates navigation directions in real time over a maintained continuous communicative connection. In other words, a reconnection is avoided by using the same connection for each of the navigation request, the navigation directions and the automatic updates. When a route change is not needed the routine ends in block 408B.

Figure 5:
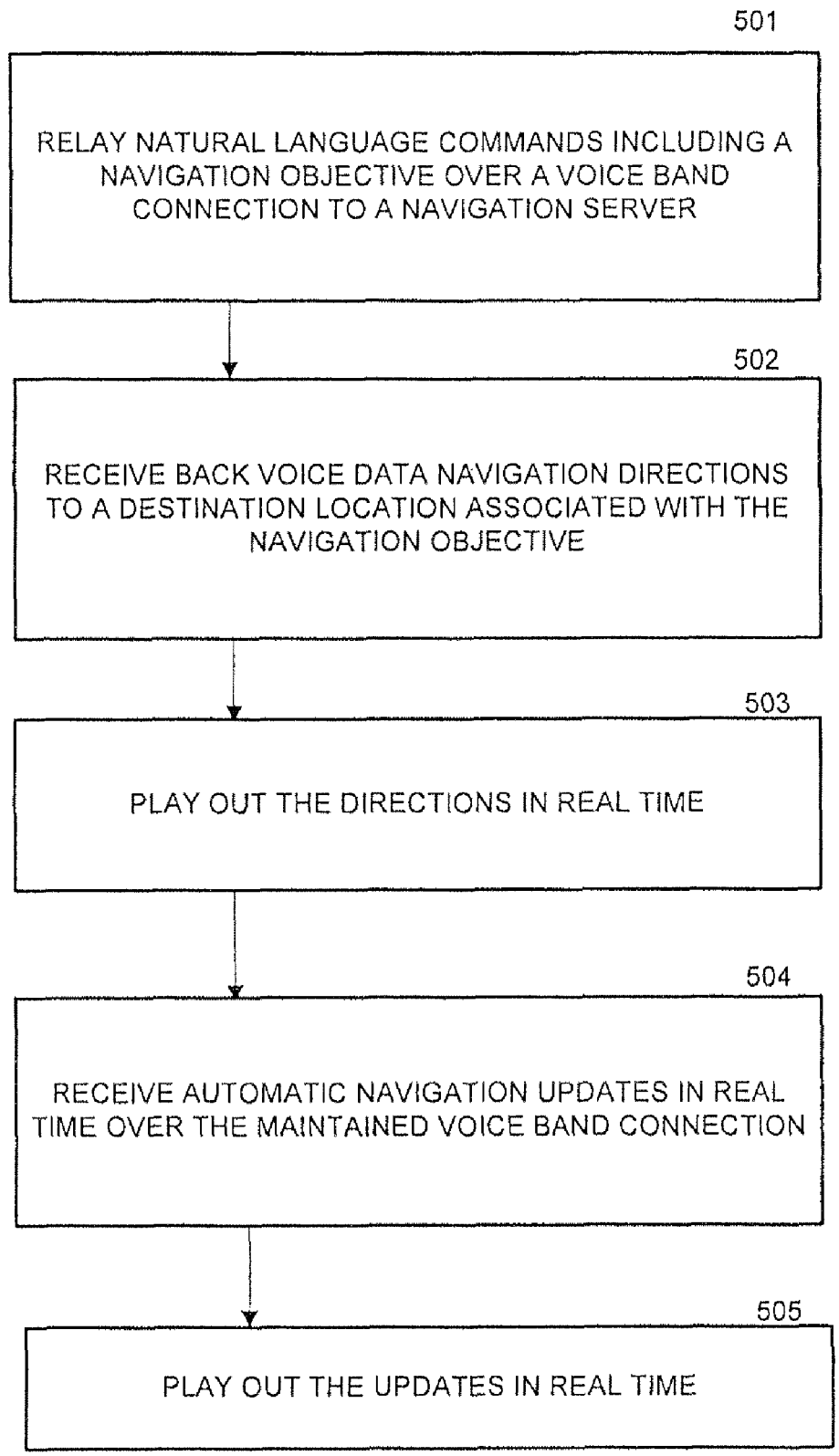
FIG. 5 is a flowchart showing how the navigation device in FIG. 1 receives navigation directions.

FIG. 5 is a flowchart showing how the navigation device in FIG. 1 receives navigation directions. In block 501 the device 5 relays, in real time, natural language commands including a navigation objective over a voice band connection. The commands are not converted or stored by the device 5, which requires very little computing power.

In block 502 the device 5 receives back voice data navigation directions to a destination location associated with the navigation objective. The navigation directions are played in real time in block 503. In block 504 the device 5 may receive automatic navigation updates in real time over the continuously maintained voice band connection. The device 5 plays out the updates in real time in block 505.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. An apparatus, comprising:
   a processor; and
   a memory coupled to the processor comprising instructions executable by the processor, the processor operable when executing the instructions to:
   access a navigation request from a remote network device identifying a navigation objective;
   determine a location of the navigation objective;
   receive speech from the remote network device and convert the received speech into text data;
   store a table including entries mapping structure location identifiers to locations on a structure map;
   compare the text data to the entries to correlate the text data to a particular one of the entries;
   determine a location of the remote network device with respect to the navigation objective based on the correlation, wherein the location of the remote network device is determined based on the received speech using said speech-to-text conversion, said stored table, and said correlation;
   generate directions from the determined location of the remote network device to the determined location of the navigation objective; and
   transmit the generated directions to the remote network device.

2. The apparatus of claim 1, wherein the processor is operable to generate speech based on at least one of the structure location identifiers specified in the entries and transmit the generated speech over a network to the remote network device.

3. The apparatus of claim 2, wherein the navigation objective is a dynamic navigation objective, and wherein the processor is operable when executing the instructions to determine the location of the dynamic navigation objective by identifying a person, a movable object, or a meeting associated with the dynamic navigation objective.

4. The apparatus of claim 3, wherein the processor is operable when executing the instructions to determine the location of the dynamic navigation objective by communicating with a security access system or a wireless network that interconnects computers located within the structure.

5. The apparatus of claim 3, wherein the processor is operable when executing the instructions to determine the location of the remote network device with respect to the dynamic navigation objective by associating a Radio Frequency Identification (RFID) tag corresponding to the remote network device with an RFID terminal.

6. The apparatus of claim 3, wherein the generated directions comprise generated speech ready for immediate play out by the remote network device independently of any natural language decoding subsequent to transmission as speech over the network.

7. A system, comprising:
   a portable network device wirelessly coupled to a server over a network;
   the portable network device configured to generate a navigation request in response to input from a user for wireless transmission to the server, the navigation request listing the name of a person or the name of a meeting;
   the server configured to receive and process the navigation request and discover a current location of the person or the meeting;
   the server configured to generate directions from a location of the portable network device to the discovered current location of the person or the meeting; and
   the portable network device configured to receive the directions over a wireless receiver as speech and play out the received speech directions.

8. The system of claim 7, wherein the locations of the portable network device and the person or meeting relate to a particular facility.

9. The system of claim 8, the server configured to determine the location of the portable network device based on speech wirelessly transmitted from the portable network device, wherein the directions are arranged to guide the user from a floor of a structure of the facility to another floor that is above or below the floor.

10. A method, comprising:
    accessing a navigation request from a remote network device identifying a dynamic navigation objective;
    determining a location of the dynamic navigation objective wherein determining the location of the dynamic navigation objective and the location of the remote network device is with respect to a particular facility, and wherein determining the location of the dynamic navigation objective is by identifying a person or a meeting associated with the dynamic navigation objective;
    determining the location of the remote network device with respect to the dynamic navigation objective;
    generating directions from the location of the remote network device to the location of the dynamic navigation objective for communication to the remote network device;
    accessing an employee office location directory for the person or a conference room location directory for the meeting to determine the location of the dynamic navigation objective; and comparing the location of the dynamic navigation objective and the location of the remote network device to a facility map.

11. The apparatus of claim 1, wherein the processor is further operable to transmit a Media Resource Control Protocol (MRCP) communication over a packet switched network to translate the navigation request before generating the directions.

12. The apparatus of claim 1, wherein the processor is further operable to automatically send course corrections in real time as speech.

13. The method of claim 10, wherein determining the location of the remote network device with respect to the dynamic navigation objective includes first communicating with a Global Positioning System (GPS) to identify a longitudinal and latitudinal position of the user location and then comparing the longitudinal and latitudinal position with the facility map to produce a pinpointed user location within the facility.

14. A method, comprising:
   generating a navigation request in response to input from a user for communication to one or more servers from a mobile network device of the user, the navigation request identifying a dynamic navigation objective of the user, wherein the dynamic navigation objective is a person or a meeting; and
   accessing directions from a location of the mobile network device to a location of the dynamic navigation objective generated by the one or more servers in response to the navigation request for presentation to the user, wherein the directions are received by the mobile network device as voice data over a voice band connection extending between the mobile network device and the one or more servers.

15. The method of claim 14, wherein the locations of the mobile network device and the dynamic navigation objective relate to a particular facility.

16. The method of claim 15, wherein the facility is a plural-floor facility and the directions are arranged to guide the user from a floor within the facility to another floor that is above or below the floor.

17. The method of claim 16, wherein the directions include indications of where to turn inside the facility and descriptions of reference points located inside the facility.

18. The apparatus of claim 1, wherein the navigation objective is a dynamic navigation objective, and wherein the dynamic navigation objective changes from a first place at a first point in time to a second place at a second point in time while the user is navigating toward the dynamic navigation objective, and wherein the apparatus is configured to continually transmit updates of current location information associated with the dynamic navigation objective to adjust for the change from the first location at the first point in time to the second location at the second point in time.

* * * * *

UNITED STATES PATENT AND TRADEMARK OFFICE
CERTIFICATE OF CORRECTION

PATENT NO. : 7,774,132 B2  
APPLICATION NO. : 11/428782  
DATED : August 10, 2010  
INVENTOR(S) : DeGrazia Page 1 of 1

It is certified that error appears in the above-identified patent and that said Letters Patent is hereby corrected as shown below:

At column 10, line 51, please replace "objective" with --objective,--.

Signed and Sealed this
Twenty-sixth Day of July, 2011

David J. Kappos
*Director of the United States Patent and Trademark Office*